United States Patent
Ichihara (10) Patent No.: US 6,977,680 B1
(45) Date of Patent: Dec. 20, 2005

(54) IMAGE DATA REDUCTION AND PROCESSING SYSTEM

(75) Inventor: Shintaro Ichihara, Tokyo (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/534,563

(22) Filed: Mar. 27, 2000

(30) Foreign Application Priority Data

Mar. 26, 1999 (JP) ................................. 11-083568
Mar. 8, 2000 (JP) ............................. 2000-063463

(51) Int. Cl.$^7$ ............................................. H04N 5/76
(52) U.S. Cl. .............................. 348/231.99; 348/211.1; 348/207.1
(58) Field of Search ..................... 348/207.99, 207.1, 348/207.11, 207.2, 211.1, 211.2, 211.4, 231.99, 348/231.1, 231.7, 333.02, 231.12, 231.4, 348/14.01, 14.02, 17, 14.12, 333.01; 455/566

(56) References Cited

U.S. PATENT DOCUMENTS

| | | | |
|---|---|---|---|
| 5,740,161 A | * | 4/1998 | Porter et al. ................. 370/260 |
| 5,806,005 A | * | 9/1998 | Hull et al. .................... 455/566 |
| 5,903,309 A | * | 5/1999 | Anderson .............. 348/333.02 |
| 6,259,469 B1 | * | 7/2001 | Ejima et al. ............. 348/14.01 |
| 6,353,699 B1 | * | 3/2002 | Schwab ........................ 386/46 |
| 6,573,927 B2 | * | 6/2003 | Parulski et al. ............... 348/32 |
| 2003/0169342 A1 | * | 9/2003 | Steinberg et al. ........ 348/207.1 |

FOREIGN PATENT DOCUMENTS

| | | | |
|---|---|---|---|
| JP | 7-168845 | 7/1995 | |
| JP | 10-304231 | 11/1998 | |
| JP | 10-336238 | 12/1998 | |
| JP | 10-341364 | 12/1998 | |
| JP | 11-025039 | 1/1999 | |
| JP | 2948974 | 7/1999 | .......... H04N 5/232 |

* cited by examiner

Primary Examiner—Tuan Ho
(74) Attorney, Agent, or Firm—Sughrue Mion, PLLC (57) ABSTRACT

An image data processing system includes a digital camera having a conversion means for conversing the light from a photographic object to the image data, and a storage medium, an image data memory apparatus having a memory section storing the image data, reduction image data forming means for forming the reduction image data according to the image data and a communication apparatus having a communication device transmitting and receiving the image data and the reduction image data between the digital camera and the image data memory apparatus, and a communication path to which the communication apparatus is connected, wherein the image data is stored in the memory section, and the reduction image data is stored in the storage medium.

10 Claims, 6 Drawing Sheets

| G | Y | G | Y | G | Y |
|---|---|---|---|---|---|
| M | C | M | C | M | C |
| G | Y | G | Y | G | Y |
| M | C | M | C | M | C |
| G | Y | G | Y | G | Y |
| M | C | M | C | M | C |

IMAGE DATA REDUCTION AND PROCESSING SYSTEM

BACKGROUND OF INVENTION

1. Field of Invention

The present invention relates to an image data processing system to process the image data photographed by a digital camera.

2. Related Art

Conventionally, a digital camera by which the light is converted into electric signals by an optical sensor such as a CCD, and the electric signals are converted into the digital data and stored in a storage medium such as a flash memory, is known. When the digital camera is used, the storing of the image data or various workings can be easily carried out by an individual using a personal computer (PC) or the like, and by outputting the image by a printer connected to a personal computer, or a printer which can be directly connected to the digital camera, the photograph can be printed without development of the film. According to the improvement of the print quality of the printer, the photograph whose quality is so high that there is almost no difference to the silver halide photograph, can also be printed.

The digital camera uses a flash memory housed in the digital camera or a storage medium such as a memory card which is detachable from the digital camera, in order to store the photographed image data. The light inputted from the photographic object into a optical sensor such as a CCD, is converted into the digital data by an A/D converter, and after it is processed by exposure compensation and data compression, it is stored in the flash memory or the storage medium such as a memory card, as the image data. The number of images which can be stored in the flash memory or the memory card, which is used for the digital camera, is about from several number of sheets to several tens of sheets, although it is changed depending on the degree of the compression of the image data, that is, the image quality. Accordingly, in order to store the more image data, it is necessary that the larger number of sheets of the flash memory and memory card are prepared.

However, because the cost of the flash memory and memory card is comparatively high, there is a problem that, when the several number of memory cards are prepared, the purchasing cost of the digital camera becomes high.

Recently, by the aid of the rapid spread of portable terminal equipments such as a note type personal computer, and the substantiality of the communication circumstance such as the internet, by transferring the image data photographed by the digital camera to the large capacity storage apparatus such as a disk of a server computer by using the communication line such as a telephone line, and storing it, a system in which the capacity of the memory card installed in the digital camera is suppressed to the minimum, is proposed.

However, in the case where a large amount of image data photographed by the user is stored by using the large capacity of memory apparatus, there is a problem that the more the amount of image data whose photographing is completed, the more difficult is the search of the image data of the image which is desired by the user. Further, there is a problem that, even when the memory section of the server computer has the large capacity, the memory capacity allotted to the user individual is limited, and because the old unnecessary image data is stored in the memory section, the newly photographed image data can not be stored in the memory section. Further, in order to search the image data stored in the memory section of the server computer, it is necessary that, in order to connect to the server computer, the terminal equipment such as a personal computer is used, therefore, even when only the digital camera is used, in order to obtain the image data, it is necessary for the user to have the personal computer, or the like, inevitably.

SUMMARY OF INVENTION

Accordingly, an object of the present invention to provide an image data processing system by which a desired image data can be easily searched from a large amount of image data stored in an image data memory apparatus.

Another object of the present invention is to provide an image data processing system by which the image data stored in an image data memory apparatus can be searched by using a digital camera.

According to an image data processing system according to the first aspect of the invention, the digital camera and the image data memory apparatus to store the image data are connected through a communication means provided with a communication apparatus and a communication path connected to those. The light from a photographic object, photographed by the digital camera, is converted into the image data, and stored in the image data memory apparatus through the communication means. Further, the reduction image data is formed according to the image data, and the reduction image data is stored in a storage medium of the digital camera. Accordingly, because the image data stored in the digital camera is only the reduction image data, it is not necessary to install a large capacity of storage medium in the digital camera.

According to the image data processing system according to the second aspect of the invention, the digital camera is provided with an image display means which can display the image according to the image data and the reduction image data, and because the user can search the image data stored in an image data storage server by using the image according to the reduction image data displayed on the image display means of the digital camera, even when a large amount of image data is stored in the image data storage server, the desired image can be easily searched.

According to the image data processing-system according to the third aspect of the invention, because a reduction image data forming means is provided in the image data storage server, it is not necessary to install a complicated processing apparatus in the digital camera.

According to the image data processing system according to the fourth aspect of the invention, because the reduction image data including the image data which is photographed and transmitted is formed, the user can obtain the newest reduction image data each time when photographing is carried out by the digital camera.

According to the image data processing system according to the fifth aspect of the invention, because the digital camera receives and stores the formed reduction image data, the user can refer the reduction image corresponding to the image data stored in the image data memory apparatus, by the digital camera.

According to the image data processing system according to the sixth aspect of the invention, because the communication apparatus of the digital camera is housed inside the digital camera, it is not necessary for the user to carry the communication apparatus separately from the digital camera, thereby, the portability is increased.

According to the image data processing system according to the seventh aspect of the invention, the memory area of the image data memory apparatus in which the image data photographed by the digital camera is stored, has: a cache area which, when the memory capacity to store the newest image data is insufficient, secures the memory capacity to store the newest image data by making an area in which, for example, the oldest image data is stored, enable to be overwritten, and overwrites the newest image data on the secured memory area and stores it; and a saving area to store the photographed image data and accumulate it. Accordingly, because the user can store the image data which is desired to be temporarily stored, in the cache area, and store the important image data which is desired not to be deleted, in the saving area, thereby, the memory area in the memory section can be efficiently used.

According to the image data memory apparatus according to the eighth aspect of the invention, it has a reduction image data forming means. The reduction image data forming means forms the reduction image data according to the image data photographed by the digital camera. Therefore, the image data photographed by the digital camera is outputted to the image data memory apparatus, and the reduction image is formed in the image data memory apparatus. Then, the image data is stored in the image data memory apparatus as it is, and only the reduction image data is outputted to the digital camera. Accordingly, because the digital camera stores only the reduction image data, a large capacity of storage medium is not necessary. Further, because the reduction image data is formed in the image data memory apparatus, it is not necessary that a complicated processing apparatus is installed in the digital camera.

DETAILED DESCRIPTION OF PREFERRED EMBODIMENTS

Hereinafter, referring to the drawings, an embodiment of the present invention will be detailed.

An image data processing system of an embodiment of the present invention is shown in FIG. 1 to FIG. 5.

Figure 1:
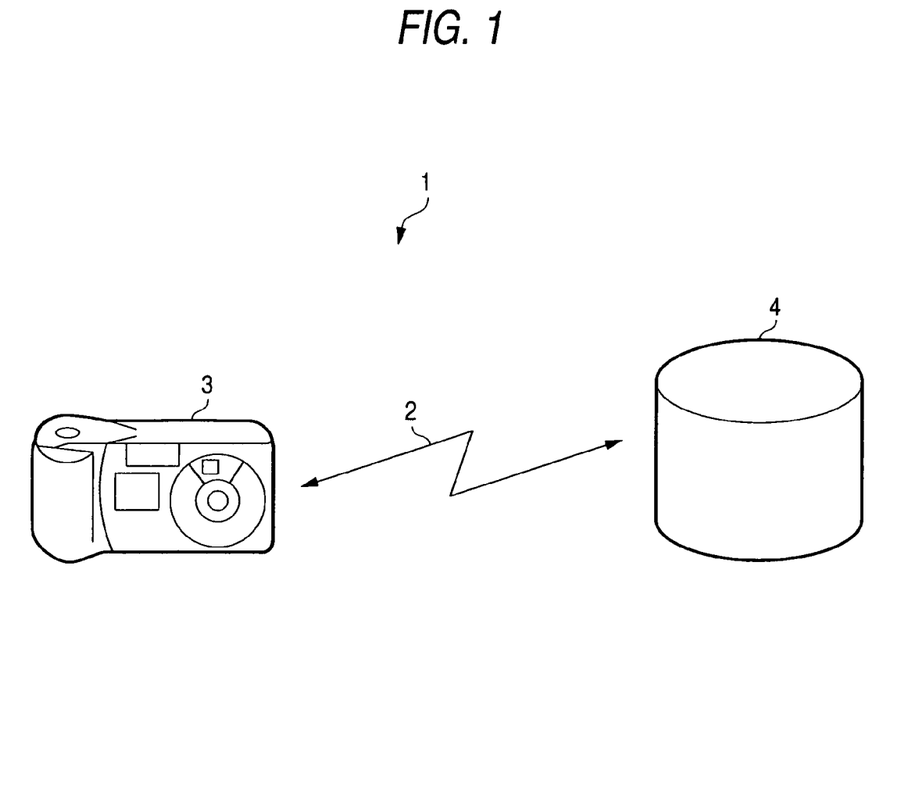
FIG. 1 is a structural view showing an image data processing system according to the embodiment of the present invention.
Figure 2:
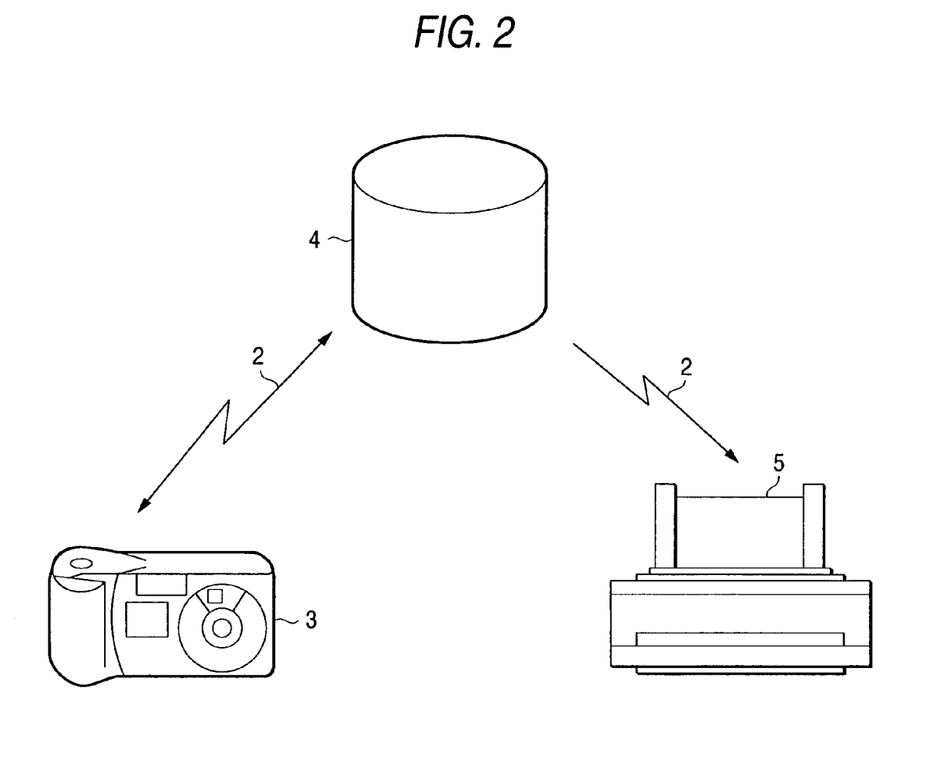
FIG. 2 is a structural view showing a structure of the image data processing system to which a printing apparatus is added, according to the embodiment of the present invention.

As shown in FIG. 1, the image data processing system 1 consists of a digital camera 3 to photograph the photographic object, and a server computer 4 as an image data memory apparatus provided with a large capacity of memory section to store the image data of the photographic object photographed by the digital camera 3. Further, as shown in FIG. 2, a printer 5 is connected to the server computer 4, and an image according to an image data stored in the memory section can also be printed.

Figure 3:
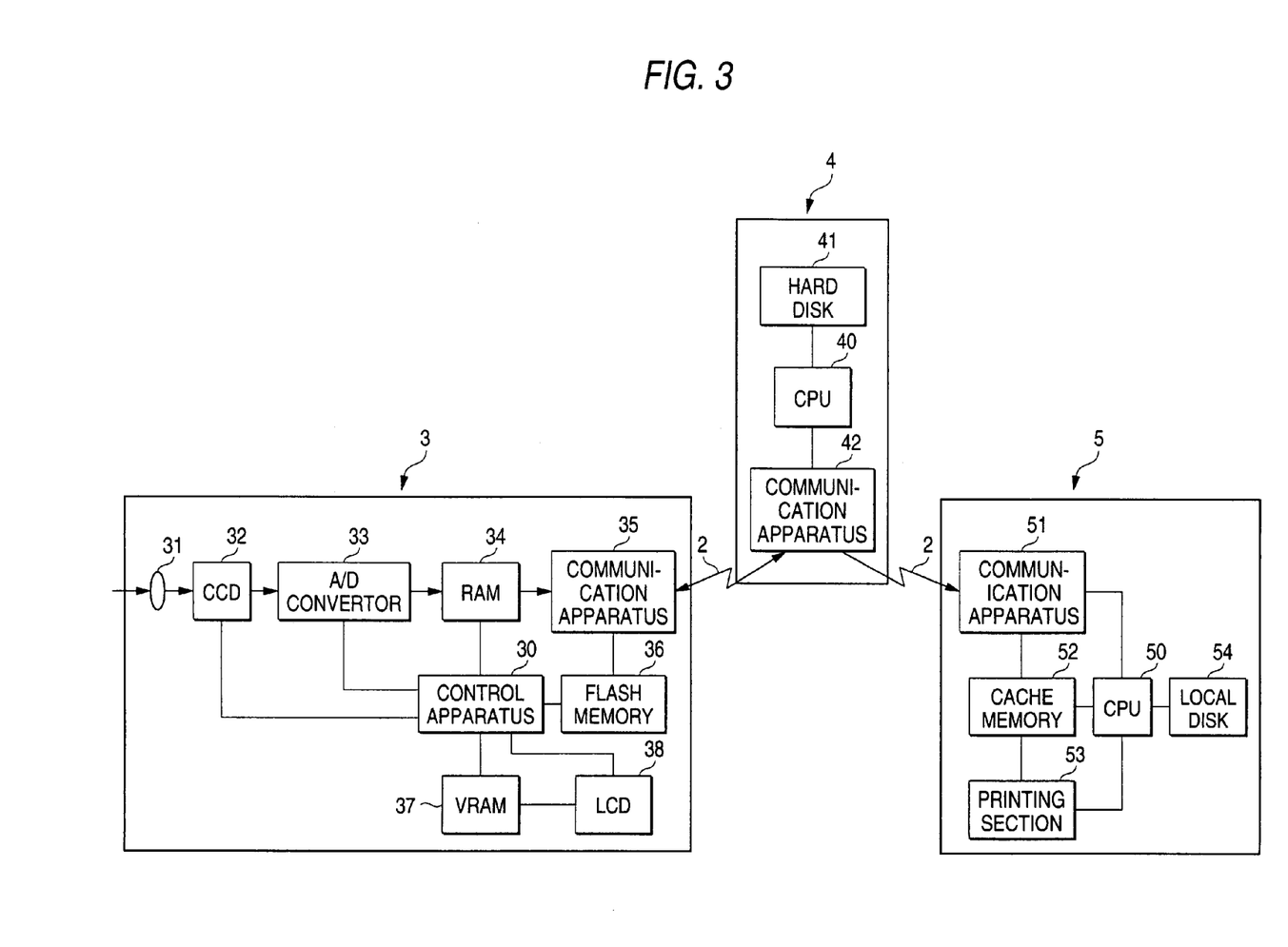
FIG. 3 is a block diagram showing the image data processing system according to the embodiment of the present invention.

As shown in FIG. 3, the server computer 4 has: a CPU 40 serving as a computer main body which can conduct the image processing and each kind of control; a hard disk 41 as a memory section; and a communication apparatus 42 to connect to a communication path 2 which is connected to the digital camera 3 or the printer 5. The hard disk 41 accumulates and saves a large amount of image data sent from the digital camera 3, and can be made a large amount and high speed access to it, in order to conduct data communication between the digital camera 3 and the hard disk 41 at high speed. A thumbnail 6 (shown in FIG. 6) is formed by the CPU 40.

In the present embodiment, a part of the memory area of the hard disk 41 of the server computer 4 is provided to the user as a user area. In the user area, 2 areas of a saving area in which the stored image data is not deleted, and a cache area in which, when there is no storable area of the image data, the oldest image data is deleted, and the newest image data is overwritten and renewed, are set.

As shown in FIG. 3, the digital-camera comprises: a control apparatus 30; an image pick-up means consisting of a condenser lens 31, a CCD (Charge Coupled Device) 32, and an A/D converter 33; an LCD (Liquid Crystal Display) 38 as the image display means for displaying the image; a RAM (Random Access Memory) 34 to temporarily store the image data; a flash memory 36 to store the reduction image (thumbnail)6 made by the server computer 4; a VRAM 37 in which the data for the image displayed on the LCD 38 is stored; and a communication apparatus 35 to connect to the communication path 2 by which the digital camera 3 and the server computer 4 are connected. The image pick-up element provided in the image pick-up means is not limited to the CCD as described in the present embodiment, but, for example, a MOS sensor may be used. Further, the image display means is also not limited to the LCD.

The communication means is structured by the communication path 2 which connects the communication apparatus 35 provided by being housed in the digital camera, to the communication apparatus 42 provided in the server computer 4. As the communication path 2, a wire transfer system using, for example, a telephone line, a wireless transfer system using a portable telephone or an infrared rays, and a network system using Ethernet, or the like, can be used. When the telephone line is used, a communication apparatus 35 such a MODEM may be housed in the digital camera 3.

Figure 7:
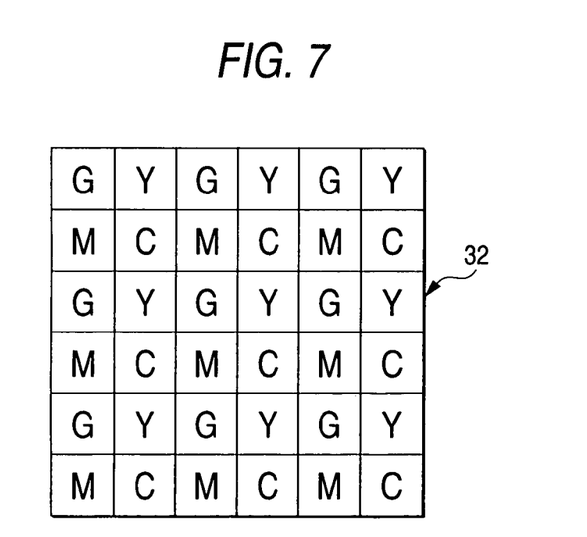
FIG. 7 is a typical view showing a CCD of the digital camera in the image data processing system according to the embodiment of the present invention.

As the CCD 32, when, for example, as shown in FIG. 7, the CCD in which a plurality of pixels are arranged in matrix-like, and which has complimentary color filters of C (Cyan), M (Magenta), Y (yellow), and G (green), is used, a color image can be photographed. There is also a case in which a CCD having original color filters of R (Red), G (Green), and B (Blue) is used.

The printer 5 is connected to the server computer 4, and can print an image according to the image data stored in the hard disk 41 corresponding to the direction directed to the digital camera 3 by the user. The printer 5 is provided with: a communication apparatus 51 to connect to the communication path 2 connected to the server computer 4; a cache memory 52 to temporarily store the image data received from the server computer 4; a printing section 53 provided with a head for printing and a print section; and a CPU 50 to control the function of the printer 5. Further, when a local disk 54 which can store the image data whose printing is completed is provided to the printer 5, when the image data whose printing has been completed once, is printed again, it is not necessary to transmit the image data again from the server computer 4.

In the case of an individual user, the printer 5 is arranged in his home, and the printer 5 is controlled from the digital camera 3 through the communication path 2 from the separated place from the home, and can print the image data stored in the hard disk 41. Further, it is also possible that the printer 5 is arranged in a photo shop, a mini-lab, or a convenience store, and a large number of peoples can use it. As the printer 5, an inkjet printer, sublimation type printer, and laser printer can be used.

Figure 4:
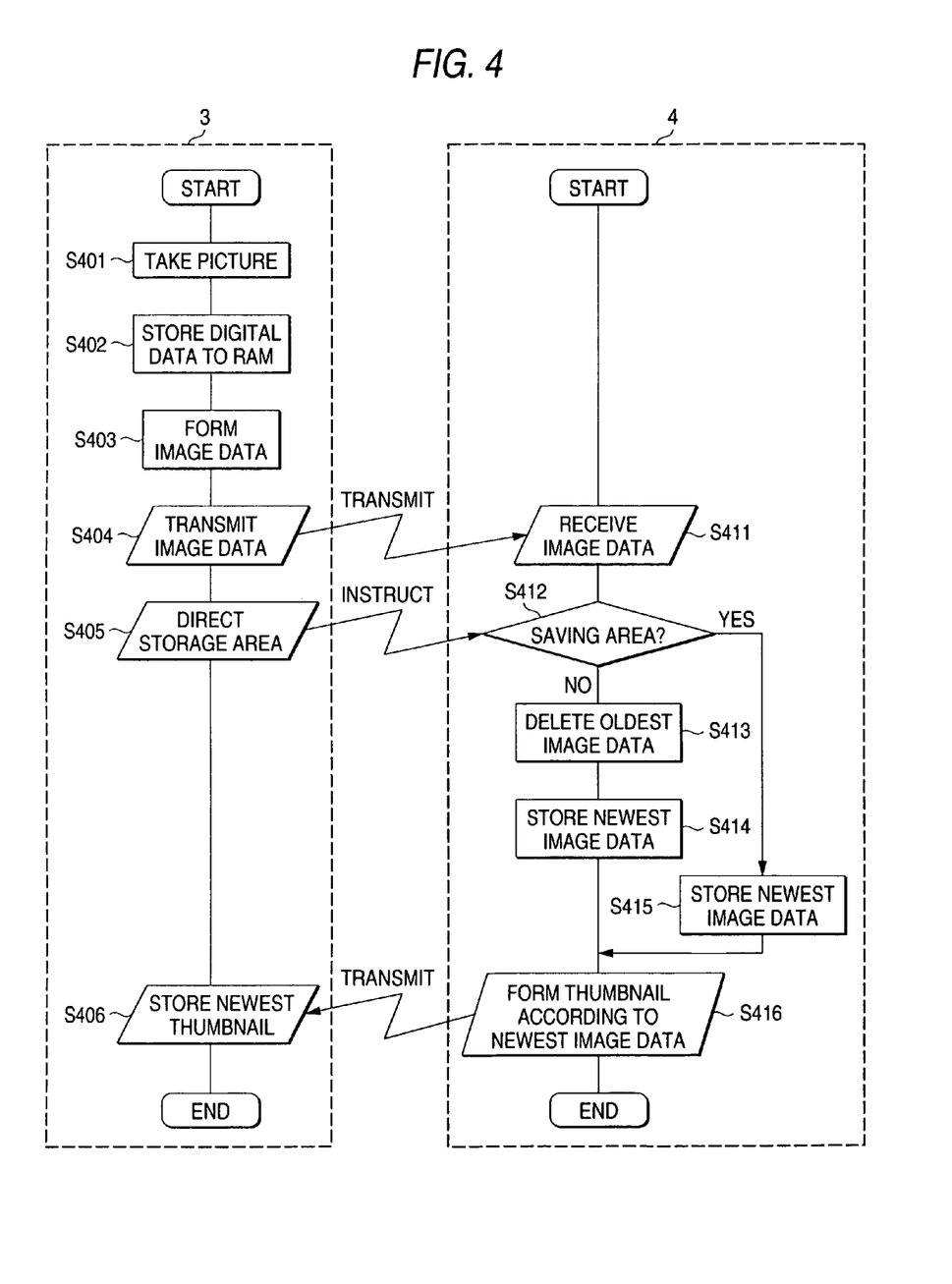
FIG. 4 is a flow chart showing a photographic operation of the image data processing system according to the embodiment of the present invention.

Next, according to a flow chart shown in FIG. 4, the photographed image processing will be described. When the photographing is conducted by using the digital camera 3 (step S401, hereinafter, briefly written as S401), the electric signal outputted from a CCD 32 is converted into a digital signal by an A/D converter 33, and the digital data outputted from the A/D converter 33 is directly stored by appointing the address of a RAM 34, by the DMA (Direct memory Access) without through a control apparatus 30 for increasing the speed (S402). On the digital data, each kind of image correction such as the adjustment of the white balance, interpolation processing, and color correction is conducted by the control apparatus 30 of the digital camera 3, and the digital data is compressed by a method of JPEG (Joint Photographic Experts Group) or the like, and is formed as the image data with a small capacity (S403). JPEG is an irreversible image compression method which can process images of about 167 million colors of 256 gradations of each of R, G and B, and is commonly used, and by changing the compression rate, the image quality of the saved image can be adjusted. Further, the image data whose compression is completed, can also be temporarily saved in the flash memory 36.

The formed compressed image data is transmitted to the server computer 4 outside of the digital camera 3 through the communication path 2 (S404), and the server computer 4 receives the image data. Herein, the digital data is not processed in the digital camera 3, and transmitted to the server computer 4, and the server computer 4 may conduct each kind of image compensation and compression on the digital data. When the image data whose compression is completed, is temporarily saved in the flash memory 36, it is desirable that the image data which is saved in the flash memory 36 is automatically deleted after it is transmitted to the server computer 4.

The image data whose processing is completed, is stored in either one of the saving area or the cache area of the hard disk 41 according to the direction from the user. The user directs the storage area of the image data to the digital camera 3 (S405). The direction directed to the digital camera 3 is received by the server computer 4, the server computer 4 judges to store the image data in which of the saving area or the cache area (S412). In the case where the image data is stored in the cache area, when the memory capacity necessary to store the newest image data is not remained in the cache area, the oldest image data-stored in the hard disk 41 is deleted (S413), and after the area is secured, the newest image data is stored (S414). On the one hand, when the image data is stored in the saving area, the newest image data is stored in the hard disk 41 without deleting other image data (S415).

When the store of the image data is completed, the server computer 4 forms a thumbnail 6 according to the image data including the newest image data, stored in the hard disk 41 (S416). The thumbnail 6 is the reduction images into which all image data stored in the hard disk 41 are reduced, and which are displayed index-like, and after the store of the image data is completed, the thumbnail 6 is formed according to the newest image data including the image data newly stored in the cache area and the saving area.

The formed thumbnail 6 including the newest image data is transmitted to the digital camera 3 by using the communication path 2, and is stored in the flash memory 36 of the digital camera 3 (S406). The newest reduction image data is transmitted from the server computer 4, each time when the user conducts the photographing by using the digital camera 3, and the thumbnail 6 stored in the flash memory 36 is renewed by the newest reduction image data. Accordingly, the user can always confirm the newest information of the image data stored in the server computer 4 by the thumbnail 6. Further, because only the thumbnail 6 is stored in the flash memory 36, the necessary memory capacity can be reduced, and even when the user takes a large number of pictures, it is not necessary to prepare a large number of sheets of the flash memory 36.

The image data stored in the hard disk 41 is related to the thumbnail 6 as follows. The image data stored in the cache area and the saving area of the hard disk 41 has a file name respectively. For example, in the order of photographing, a name such as [001. JPEG], [002. JPEG], [00n, JPEG (n is an integer)], is named. File names corresponding to these file names of the image data are named to respective images of the thumbnail 6. For example, corresponding to the image data, file names such as [001s. JPEG], [002s. JPEG], [00 ns. JPEG (n is an integer)], are named. According to this, for example, when the image data [001s. JPEG] included in the thumbnail 6 is selected from the digital camera 3, the image data [001. JPEG] stored in the hard disk 41 is selected.

Figure 5:
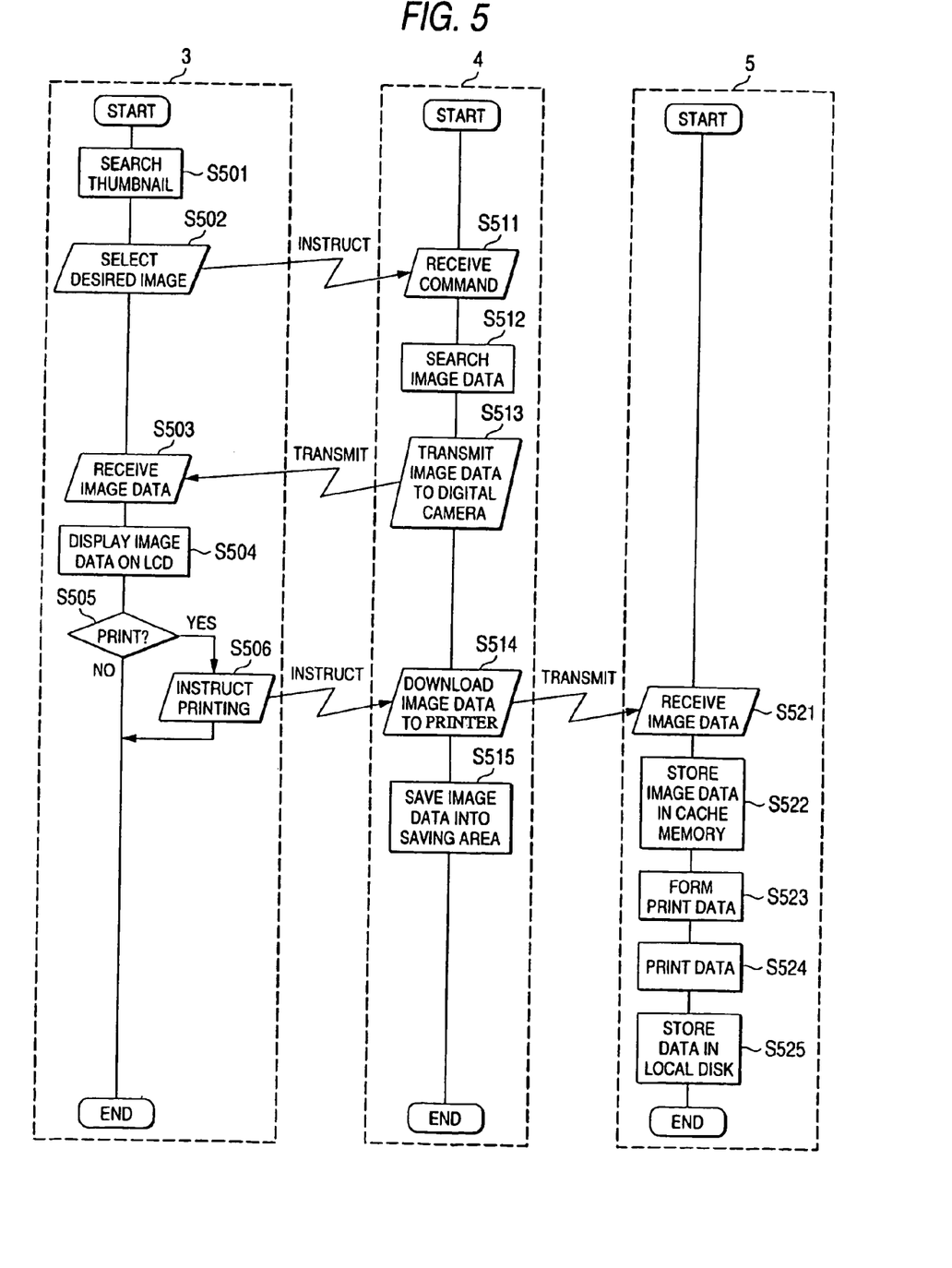
FIG. 5 is a flow chart showing a print and reproduction operation of the image data processing system according to the embodiment of the present invention.

Next, according to a flow chart in FIG. 5, the processing in which the image data stored in the hard disk 41 is reproduced by the digital camera 3 and printed by the printer 5, will be described.

When the image according to the image data stored in the hard disk 41 is printed by the printer 5, and reproduced on the LCD 38 of the digital camera 3, the direction of the print and reproduction can be directed from the digital camera 3.

Figure 6:
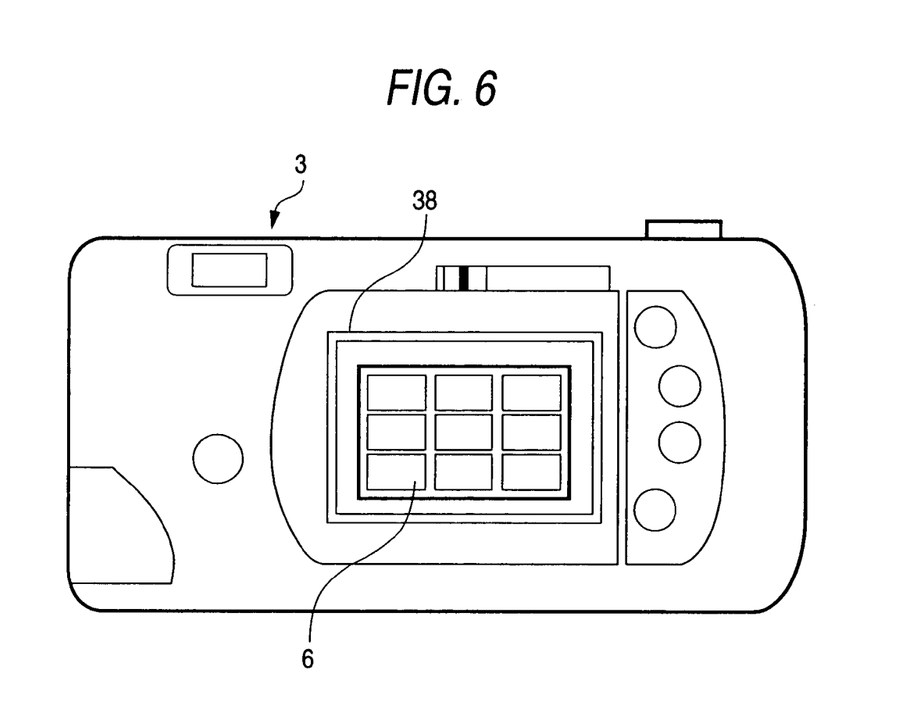
FIG. 6 is an outline rear view showing a digital camera in the image data processing system according to the embodiment of the present invention.

As shown in FIG. 6, while looking at the thumbnail 6 displayed on the LCD 38 of the digital camera 3, the user searches the image desired to be printed or reproduced (S501). By using the thumbnail 6 for the search, even when a large amount of image data is stored in the hard disk 41, the user can easily search and select the desired image (S502). When the user looks at the thumbnail 6 and selects the desired image and directs (S511), the server computer 4 receives the direction from the digital camera 3 (S511), and searches the image data of the selected image by the user, from the hard disk 41 (S512). In the present embodiment, as shown in FIG. 6, the form in which 9 sheets of the thumbnail of the length 3 rows×width 3 rows are displayed, is adopted, but, a form in which 4 sheets of images of both the length and width of 2 rows are displayed, or a form in which 16 sheets of the thumbnail of both the length and width of 4 rows are displayed, may be adopted.

The searched image data is transmitted from the hard disk 41 to the digital camera 3 though the communication path 2 (S513).

The digital camera 3 receives the image data transmitted from the server computer 4 (S503), and can display the image according to the received image data on the LCD 38 of the digital camera 3 (S504). The user confirms the image displayed on the LCD 38, and judges whether the image is printed (S505). When the user directs the print of the image displayed on the LCD 38 to the digital camera 3 (S506), the direction is transmitted to the server computer, and the server computer 4 downloads the same image data as the image displayed on the LCD 38 from the hard disk 41 to the printer 5 (S514).

The printer 5 receives the downloaded image data (S521), and stores the image data once in the cache memory 52 provided in the printer 5 (S522). As for the image data stored in the cache memory 52, the print data is formed by the CPU 50 provided in the printer 5 for each time when the print is conducted (S523), and the print is conducted by the print section 53 according to the print data (S524). As described above, when the image data is stored in the cache memory 52, in the case where a plurality of sheets of the images according to the same image data are continuously printed, the print can be quickly conducted. This is for the reason that: for example, even when the image data stored in the hard disk 41 of the server computer 4 is compressed by the method of JPEG, or the like, and its data capacity is about 100 k bytes, when it is converted into the print data to print by the printer 5, the data becomes the large data of several megabytes to several tens megabytes, although it depends on the capacity of the image to be printed, therefore, rather than in the case where the print data is formed by the server computer 4 and downloaded to the printer 5 and then printed, in the case where the image data is downloaded once from the hard disk 41 to the cache memory 52 of the printer 5 and stored, and the image data is converted into the print data by the printer each time when the print is conducted, the quicker print can be conducted.

When the print is completed, the image data stored in the cache memory 52 is saved in the local disk 54 provided in the printer 5 (S525). Accordingly, when the same image as the image once printed is reprinted, because the image data is saved in the local disk 54, it is not necessary to connect to the hard disk 41 of the server computer 4, and download the image data.

Further, when the image data used for the reproduction or the print is stored in the cache area of the hard disk 41, the reproduced or printed image data is rewritten in the saving area of the hard disk 41 (S515). Accordingly, the image data which has so high frequency in use as it is necessary for the user to reproduce or print it, is not deleted.

In the above, as described by using the embodiment, according to the image data processing system of the present invention, the digital camera stores only the reduction image data, and because the practical image data is stored in the image data storage server, the capacity of the storage medium installed in the digital camera can be reduced, and the number of sheets of the images which can be photographed, can be increased.

Further, because the user can search the desired image by using the reduction images recorded in the digital camera, the operation of the user necessary for searching the image data can be simplified.

Further, because the reduction image data stored in the digital camera is in timed relationship with the image data stored in the image data storage server, the user can always confirm the newest image data by using the digital camera.

Further, because the user can search and give the direction to print or reproduce the image data stored in the image data storage server by using the digital camera, it is not necessary to have the personal computer, or the like.

In the above, a form in which the hard disk is used as the memory section of the server computer, is described in the present invention, however, in the present invention, when a memory section which has large capacity, and can make random access and is high speed, such as the magnetic disk or optical disk is used, the memory section is not limited to the hard disk.

Further, in the present embodiment, the flash memory is used as the storage means for storing the image data of the reduction image in the digital camera, however, when a medium which can store and rewrite the image data, is used, the storage means is not limited to the flash memory.

Further, in the present embodiment, the processing of the still image photographed by the digital camera is described, however, it is not limited to the still image, but may be the moving picture. When the moving picture is used, the first one frame of the moving picture is stored in the digital camera as the thumbnail.

What is claimed is:

1. An image data processing system comprising:
   a digital camera having a conversion means for converting the light from a photographic object to image data, and a storage medium;
   an image data memory apparatus having a memory section storing the image data;
   reduction image data forming means for forming reduction image data according to the image data; and
   a communication apparatus having a communication device transmitting and receiving the image data and the reduction image data between the digital camera and the image data memory apparatus, and a communication path to which the communication apparatus is connected,
   wherein:
      the image data is stored in the memory section, and the reduction image data is stored in the storage medium,
   the reduction image data is a thumbnail,
      the digital camera includes an image display means for displaying one of the image data and an image according to the reduction image data, and
      the reduction image data forming means is provided in the image data memory apparatus.

2. The image data processing system described in claim 1, wherein the reduction image data forming means forms the reduction image data according to the image data stored in the memory section, including the image data received from the digital camera.

3. The image data processing system described in claim 2, wherein the digital camera is provided with storing means for receiving the reduction image data and storing it in the storage medium.

4. The image data processing system described in claim 3, wherein the digital camera houses therein the communication apparatus.

5. The image data processing system described in claim 4, wherein the memory section of the image data memory apparatus has a cache area in which the stored image data is deleted at need and the new image data is stored, and a saving area to accumulate the image data.

6. The image data processing system described in claim 1, wherein the image data is removed from the digital camera, after transmitting to the image data memory apparatus, and later restored to the digital camera.

7. The image data processing system described in claim 1, where the image data is automatically deleted from the digital camera after the image data is transmitted to the image data memory apparatus.

8. An image data memory apparatus comprising:
a memory section for receiving image data photographed by an outside digital camera and for storing it;
reduction image data forming means for forming reduction image data according to the image data; and
transmission means for transmitting the reduction image data to the digital camera,
wherein:
  the reduction image data is a thumbnail,
  the digital camera includes an image display means for displaying one of: the image data and an image according to the reduction image data, and
  the reduction image data forming means is provided in the image data memory apparatus.

9. An image data processing system comprising:
a digital camera having a converter which converts light from a photographic object to image data, and a storage medium;
an image data memory apparatus having a memory section storing the image data;
reduction image data device which forms reduction image data according to the image data; and
a communication apparatus having a communication device transmitting and receiving the image data and the reduction image data between the digital camera and the image data memory apparatus, and a communication path to which the communication apparatus is connected,
wherein:
  the image data is stored in the memory section, and the reduction image data is stored in the storage medium,
  the reduction image data is a thumbnail,
  the digital camera includes an image display that displays one of the image data and an image according to the reduction image data, and
  the reduction image data device is provided in the image data memory apparatus.

10. The image data processing system described in claim 9, wherein the reduction image data device forms the reduction image data according to the image data stored in the memory section, including the image data received from the digital camera.

* * * * *